United States Patent
Lin et al.

(10) Patent No.: US 6,721,000 B1
(45) Date of Patent: Apr. 13, 2004

(54) ADAPTIVE PIXEL-LEVEL COLOR ENHANCEMENT FOR A DIGITAL CAMERA

(75) Inventors: Tao Lin, Fremont, CA (US); Tianhua Tang, Sunnyvale, CA (US)

(73) Assignee: NeoMagic Corp., Santa Clara, CA (US)

( * ) Notice: Subject to any disclaimer, the term of this patent is extended or adjusted under 35 U.S.C. 154(b) by 0 days.

(21) Appl. No.: 09/511,012

(22) Filed: Feb. 23, 2000

(51) Int. Cl.[7] .................................................. H04N 9/73
(52) U.S. Cl. ............................... 348/223.1; 348/228.1; 348/234; 348/237; 348/279; 382/167
(58) Field of Search ................................ 348/234, 237, 348/272, 279, 273, 222.1, 223.1, 228.1, 655; 382/162, 167; 358/518, 520, 523

(56) References Cited

U.S. PATENT DOCUMENTS

| | | | |
|---|---|---|---|
| 4,647,963 A | 3/1987 | Johnson et al. ............... 358/80 |
| 4,652,869 A | 3/1987 | Vakil .......................... 340/703 |
| 4,814,859 A | 3/1989 | Kimura et al. ................ 358/22 |
| 5,012,331 A | 4/1991 | Schuster ...................... 358/37 |
| 5,189,511 A | 2/1993 | Parulski et al. ............... 358/80 |
| 5,428,377 A | 6/1995 | Stoffel et al. ................. 347/15 |
| 5,508,742 A | * | 4/1996 | Geerlings et al. ........... 348/279 |
| 5,517,333 A | * | 5/1996 | Tamura et al. .............. 358/518 |
| 5,528,339 A | 6/1996 | Buhr et al. .................... 355/32 |
| 5,583,666 A | 12/1996 | Ellson ......................... 358/518 |
| 5,608,853 A | 3/1997 | Dujari et al. |
| 5,668,596 A | 9/1997 | Vogel ......................... 348/222 |
| 5,706,098 A | 1/1998 | Clark et al. .................. 358/298 |
| 5,793,885 A | 8/1998 | Kasson ........................ 382/167 |
| 5,949,409 A | 9/1999 | Tanaka et al. ............... 345/186 |
| 5,982,926 A | * | 11/1999 | Kuo et al. .................... 382/167 |
| 5,987,169 A | * | 11/1999 | Daly et al. .................. 382/167 |
| 6,094,233 A | * | 7/2000 | Miki et al. ................... 348/624 |
| 6,400,403 B1 | * | 6/2002 | Saito .......................... 348/273 |
| 6,542,187 B1 | * | 4/2003 | Hamilton et al. ........... 348/234 |

* cited by examiner

Primary Examiner—Wendy R. Garber
Assistant Examiner—Chriss S. Yoder
(74) Attorney, Agent, or Firm—Stuart T. Auvinen

(57) ABSTRACT

An adaptive color enhancer applies different scale factors to different pixels in a digital image. More color enhancement occurs for bright pixels and for dim pixels than for average-intensity pixels. Also, more color enhancement is applied to the more colorful pixels while less color enhancement is applied to dull, less-colorful pixels. Rather than enhance all pixels to the same extent, the bright, colorful pixels are enhanced further than the average. Likewise, dim areas are color enhanced more than average. A calculation unit receives a YUV pixel. The Y value is compared to range limits and a piece-wise-linear (PWL) function generates an intermediate scale factor. The absolute values of the U and V color values are combined to create a colorfulness factor. The colorfulness factor is also used with a PWL function and the intermediate scale factor to generate a final scale factor for that pixel. The final scale factor is then multiplied by the U and V values of the pixel to generate a color-corrected pixel.

9 Claims, 7 Drawing Sheets

ADAPTIVE PIXEL-LEVEL COLOR ENHANCEMENT FOR A DIGITAL CAMERA

FIELD OF THE INVENTION

This invention relates to digital cameras, and more particularly for color enhancement of a digital image.

BACKGROUND OF THE INVENTION

Family photos in color replaced earlier black-and-white photographs in the 1960's. More recently, digital cameras are replacing traditional film cameras. Digital cameras are being improved and lowered in cost at a rapid pace. Images from digital cameras can be downloaded and stored on personal computers. Digital pictures can be converted to common formats such as JPEG and sent as e-mail attachments or posted to virtual photo albums on the Internet. Video as well as still images can be captured, depending on the kind of digital camera.

Bright, rich colors in pictures are still preferred, even for digital pictures. Color enhancement can be applied to digital pictures as it has been applied in wet photofinishing processes for traditional cameras. For digital pictures, each picture dot (pixel) is originally represented by numeric values of red, green, and blue (RGB). Each RGB pixel can be converted to the YUV format, where the Y luminance component represents the overall brightness while the U and V components represent the color.

The color of a pixel can be enhanced or exaggerated by increasing the color components U or V of a pixel.

FIG. 1 is a block diagram for a typical digital camera. Light focused through a lens is directed toward sensor 12, which can be a charge-coupled device (CCD) array or a complementary metal-oxide-semiconductor (CMOS) sensor array. The light falling on the array generates electrical currents, which are amplified by analog amp 14 before being converted from analog to digital values by A/D converter 16. An 8, 9, or 10-bit mono-color pixel is output to processor 10. These mono-color pixels are in a Bayer-pattern. Each pixel is either a red, a blue, or a green intensity.

The R, G, or B digital values in the Bayer pattern are processed by processor 10 to generate luminance-chrominance YUV pixels. The YUV pixels can then be displayed on display 19 or compressed by compressor 18 and stored on disk 17 or on a solid-state memory. YUV pixels often have a 4:4:4 format, with 8 bits for each of 2 colors and for the luminance.

Sensor 12 detects red, blue and green colors. However, each array point in sensor 12 can detect only one of the three primary colors. Rather than outputting an RGB pixel, sensor 12 can output only a single-color pixel at any given time. For example, a line of pixels output by sensor 12 might have a red pixel followed by a green pixel. Another line might have alternating green and blue pixels. Each pixel contains only one-third of the total color information. The remaining color information is obtained by interpolation. Processor 10 performs this color interpolation, calculating the missing primary-color intensities for each pixel location.

Processor 10 also may perform other enhancements to the image. Edges may appear fuzzy because the color interpolation tends to spread out features. These edges can be sharpened by detecting the edges and enhancing the color change at the edge to make the color transition more abrupt. Color conversion from RGB to YUV is also performed by processor 10. Color enhancement can also be performed by processor 10.

The electrical currents produced by the different primary colors can vary, depending on the sensor used and the wavelength and energy of the light photons. An adjustment known as a white-balance is often performed before processor 10, either on analog or digital values. Each primary color can be multiplied by a different gain to better balance the colors. Compensation can also be made for different lighting conditions, increasing all primary colors for dark pictures or decreasing all colors for bright pictures (overexposure).

Color Enhancement—FIG. 2

FIG. 2 illustrates color enhancement of YUV pixels by a constant. The processor 10 of FIG. 1 may perform color enhancement once the RGB pixels are converted to YUV pixels. Enhancer 22 receives a YUV pixel and enhances the U and V color components to generate a color-enhanced pixel YU'V'.

A constant value S is applied to multipliers 24, 26. Multiplier 24 multiplies the constant scale factor S by the U component to generate the enhanced U' component. Multiplier 26 multiplies the constant scale factor S by the V component to generate the enhanced V' component. S is typically a constant greater than 1.0.

Since the U and V components are typically in the range of −0.5 to +0.5, enhancement by multiplying by the scale factor S increases the absolute value of each color component. This makes the colors appear richer.

However, all pixels in an image are multiplied by the same scale factor S. Even background portions of the image or less-important parts of the image are color enhanced to the same degree. This can sometimes produce an undesirable color saturation effect, where the image is too bright and has too much color in it.

A more preferred method would enhance some pixels, such as pixels in the more important part of a picture, while not enhancing other pixels, such as background pixels. Rather than use the same scale factor for all pixels, an adaptive scale factor that can vary from pixel to pixel is desired.

It is desired to adaptively change the color-enhancement scale factor on a pixel-by-pixel basis. It is desired to use different scale factors within a particular image. It is desired to vary the scale factor depending on the color and brightness of the pixel being enhanced. It is desired to vary the scale factor as a function of the Y, U, and V values of the pixel being color-enhanced. An adaptive color-enhancement function and method is desired.

SUMMARY OF THE INVENTION

An adaptive color enhancer has a pixel input that receives a current pixel value. A calculation unit receives the current pixel value from the pixel input. It generates an enhancement factor for the current pixel value. The enhancement factor varies for each pixel with the current pixel value. The enhancement factor is a function of the current pixel value.

An applicator receives the current pixel value from the pixel input. It applies the enhancement factor from the calculation unit to the current pixel value to generate an enhanced pixel value. The enhanced pixel value is output in place of the current pixel value. Thus pixels are color enhanced using the enhancement factor generated from the current pixel value.

In further aspects of the invention the current pixel value includes a color value and an intensity value. The calculation unit includes a first function means for generating an intermediate enhancement factor as a function of the intensity value and a second function means that receives the intermediate enhancement factor. It generates the enhancement factor as a function of the color value and as a function of the intensity value. The applicator applies the enhancement factor to the color value of the current pixel value but does not apply the enhancement factor to the intensity value of the current pixel value. Thus the color value of the current pixel value is enhanced as a function of both the intensity and color values of the current pixel value.

In further aspects the function of the color value produces more color enhancement for color values representing colorful pixels than for color values representing dull pixels. Thus colorful pixels are color-enhanced more than dull pixels. The function of the intensity value produces more color enhancement for intensity values representing bright pixels than for color values representing average-brightness pixels. Thus bright pixels are color-enhanced more than average-brightness pixels.

In still further aspects of the invention the function of the intensity value also produces more color enhancement for intensity values representing dim pixels than for color values representing average-brightness pixels. Thus bright pixels and dim pixels are color-enhanced more than average-brightness pixels.

In other aspects the first function means includes a piece-wise-linear (PWL) means for generating the intermediate enhancement factor as a PWL function of the intensity value and pre-set scale factors. The pre-set scale factors are constant for all pixels in a digital image.

In further aspects of the invention the current pixel value is a YUV value. The intensity value is a Y luminance value and the color value is a combination of U and V chrominance values. Thus the current pixel value is in a YUV format.

In further aspects the calculation unit further includes first absolute means for generating a U absolute value of a U value of the current pixel value and second absolute means for generating a V absolute value of a V value of the current pixel value. An adder means adds the U absolute value and the V absolute value to generate the color value. The color value numerically represents an overall colorfulness of the current pixel value. Thus U and V color values are combined.

DETAILED DESCRIPTION

The present invention relates to an improvement in digital color enhancement. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventor has realized that image quality can be improved by color enhancement. In prior systems, a scale factor was applied to all pixels in a picture, or the same scale factor could be used for all pixels in many different pictures. The inventor realizes that color enhancement could be improved if the scale factor were changed for different pixels within a single image, rather than using the same scale factor.

The inventor has further realized that colors that are already bright represent the more-important parts of a picture. These already-bright or more colorful pixels should be enhanced more than other dull-in-color or dim-in-brightness pixels. The inventor therefore applies a larger scale factor to pixels that are bright (larger Y) or colorful (larger absolute values of U and V).

The inventor further realizes that dim pixels often appear washed-out in color. These dim pixels also can benefit from more color enhancement than other pixels. Thus the inventor uses a larger scale factor for either dim or bright pixels, but uses a smaller scale factor (less color enhancement) for average-intensity pixels.

The inventor's color enhancement is a function of both brightness (luminance Y) and color (U and V). Pixels having high or low Y values are color-enhanced more (larger scale factor S) than pixels in the middle range of Y. Since Y is on a scale of 0.0 to 1.0, pixels with 0.6>Y>0.3 have a lower scale factor S than other pixels.

The chrominance values U and V are typically in the range of −0.5 to +0.5, with dull colors having U and V near 0, and more colorful pixels having U or V closer to the extremes of −0.5 or +0.5. The inventor adds the absolute values of U and V and then uses larger scale factors when the sum is large, but smaller scale factors when the sum is small. This provides for more color enhancement for already-colorful pixels, but less enhancement for dull, less-colorful pixels.

The color-enhancement scale factor thus is adaptively changed depending on the luminance and colorfulness of each pixel. A more pleasing image usually results from such enhancement.

Figure 1:
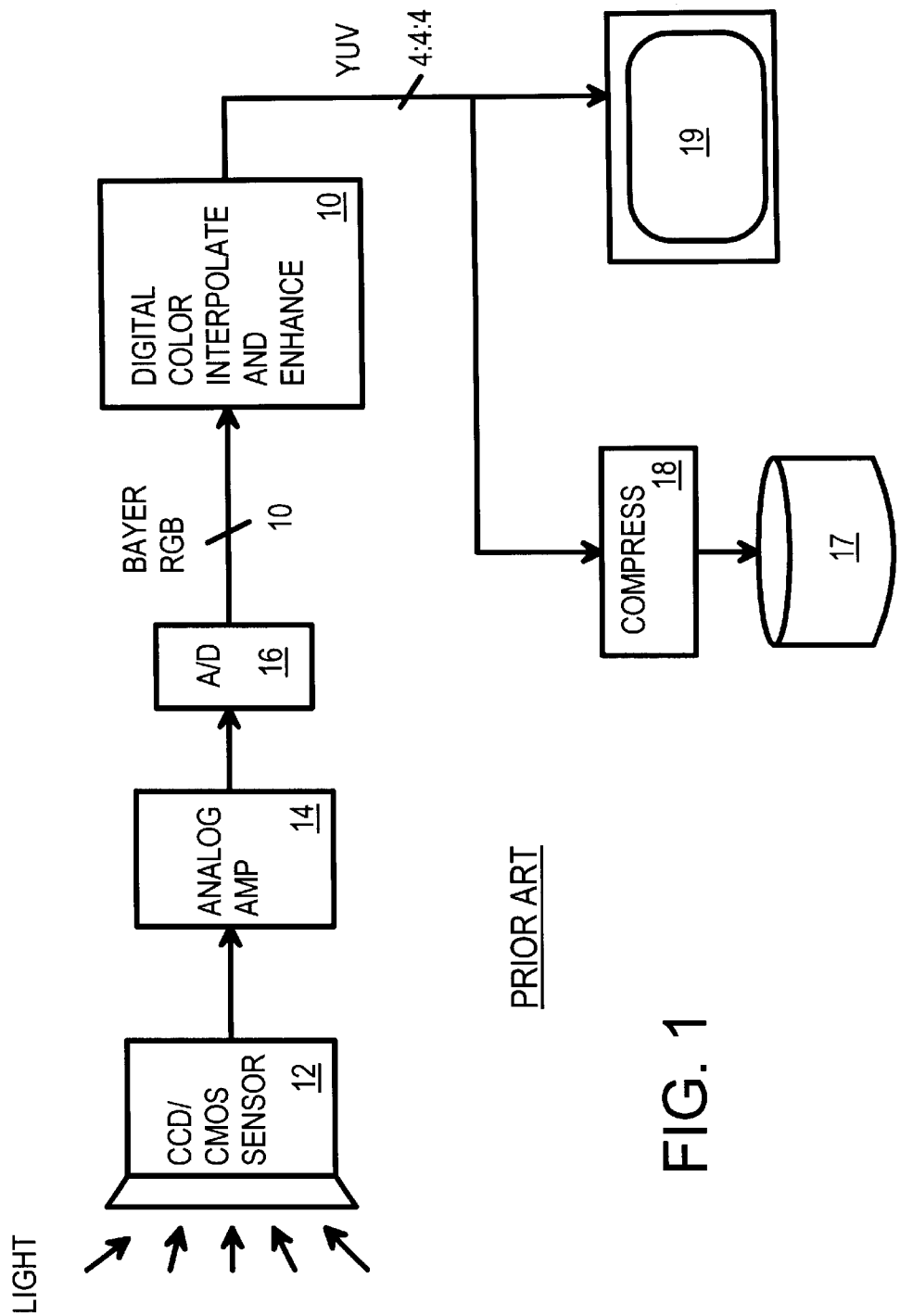
FIG. 1 is a block diagram for a typical digital camera.
Figure 2:
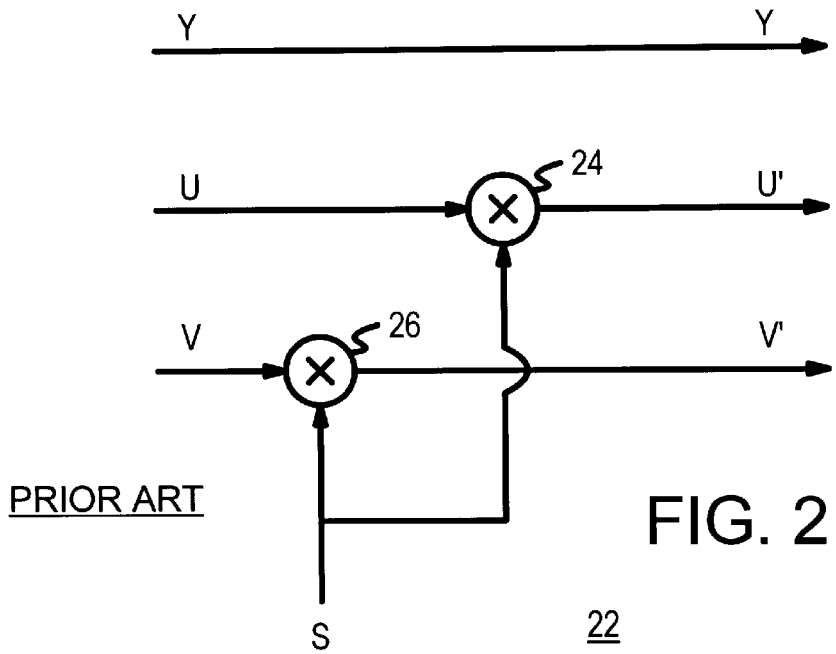
FIG. 2 illustrates color enhancement of YUV pixels by a constant.
Figure 3:
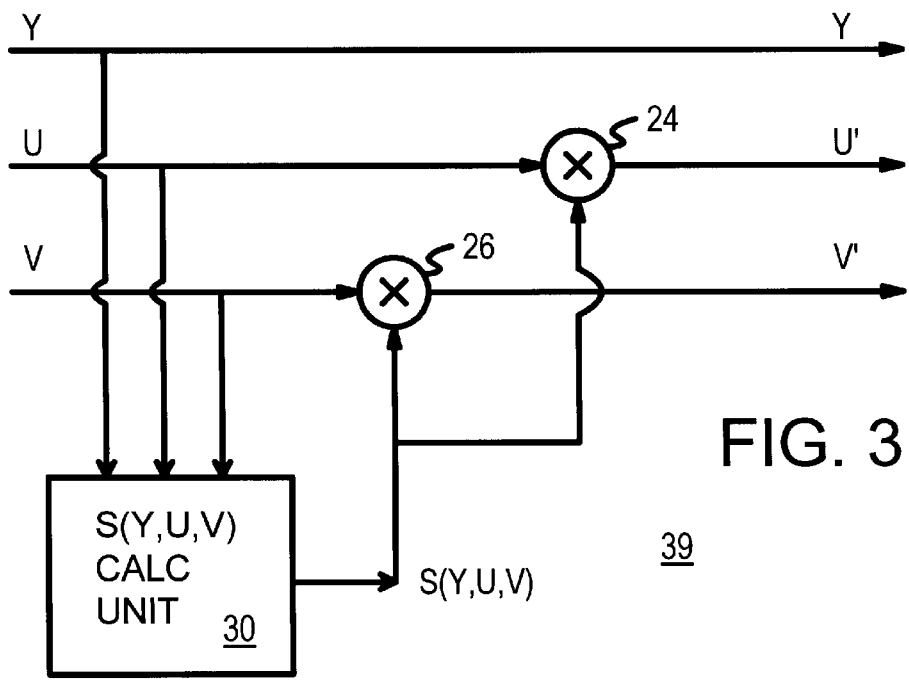
FIG. 3 highlights color enhancement where the color scaling factor is adaptively changed depending on the brightness and colorfulness of each pixel.

Pixel-Adaptive Color Scale Factor—FIG. 3

FIG. 3 highlights color enhancement where the color scaling factor is adaptively changed depending on the brightness and colorfulness of each pixel. A YUV pixel is input to color-enhancer 39. Calculation unit 30 also receives the YUV pixel. Calculation unit 30 generates the scale factor S as a function of the brightness (Y) and colorfulness (U and V) of the YUV input pixel. The scale factor S can vary for each input pixel in an image.

The scale factor S generated by calculation unit 30 is applied to multipliers 24, 26. Multiplier 24 receives the U component and multiplies it by scale factor S to produce the color-enhanced component U'. Multiplier 26 receives the V component and multiplies it by scale factor S to produce the color-enhanced component V'.

A single scale factor S is applied to both color components U and V. This scale factor is a function of all three input-pixel components and is designated S(Y,U,V).

Figure 4:
FIG. 4 shows ranges of luminance Y.

FIG. 4 shows ranges of luminance Y. The luminance value Y of a YUV pixel represents the overall brightness of a pixel, separate from the color of the pixel. The Y component has a normalized numerical value in the range of 0.0 to 1.0 as shown.

The inventor identifies a mid range of Y, from Y-Low (YL) to Y-High (YH). When the pixel's Y vale is in this middle range, less color-enhancement is applied to that pixel. The values of YL and YH can be programmable, such as by programming a register. In this example, YL is 0.3 while YH is 0.6, so that the mid-range is from 0.3 to 0.6.

Figure 5:
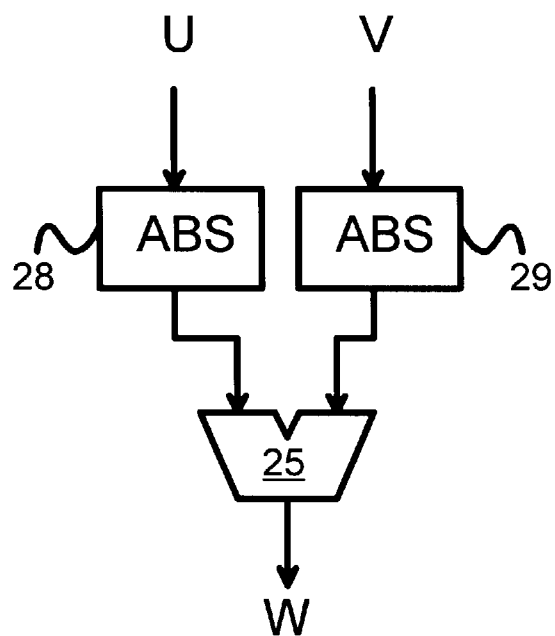
FIG. 5 shows a color-value combiner that generates a single value of colorfulness of a pixel.

U and V Components Combined—FIG. 5

FIG. 5 shows a color-value combiner that generates a single value of colorfulness of a pixel. The U and V components of a YUV pixel represent the color or hue of the pixel. The U and V components are each on a numerical scale from –0.5 to +0.5. Colors with U and V values close to 0.0 are usually perceived as being duller or less colorful than colors with more extreme U and V values, either nearer to +0.5 or –0.5 than to zero.

Absolute-generator 28 generates the absolute value of the U component, while absolute-generator 29 calculates the absolute value of the V component. When U and V are in a two's complement format, the sign bit can simply be dropped, but in other numerical formats a more complex operation may be needed.

Adder 25 receives the absolute values of U and V from absolute-generators 28, 29 and outputs their sum as component W. Thus $W=|U|+|V|$. The component W is a numerical representation of the overall colorfulness of a YUV pixel. Pixels with higher W values often appear to be more colorful than do pixels with smaller W values.

Figure 6:
FIG. 6 shows a range of colorfulness-component W values.

FIG. 6 shows a range of colorfulness-component W values. When both U and V values are close to zero, W is also near zero. This represents a dull-color pixel. When both U and V values are close to 0.5 or –0.5, W is also near its maximum, 1.0. This represents a colorful pixel.

Two inflexion points are determined by parameters W-Low (WL) and W-High (WH). These parameters WL, WH can be set by software or firmware by programming registers or can be fixed in hardware at pre-determined points. For example, WL can be 0.3 while WH is 0.6. More colorful pixels, such as pixels with W>WH, are color-enhanced to a greater degree than duller pixels with W<WL. Pixels in the mid range, WL<W<WH, are color-enhanced to an intermediate degree.

Figure 7:
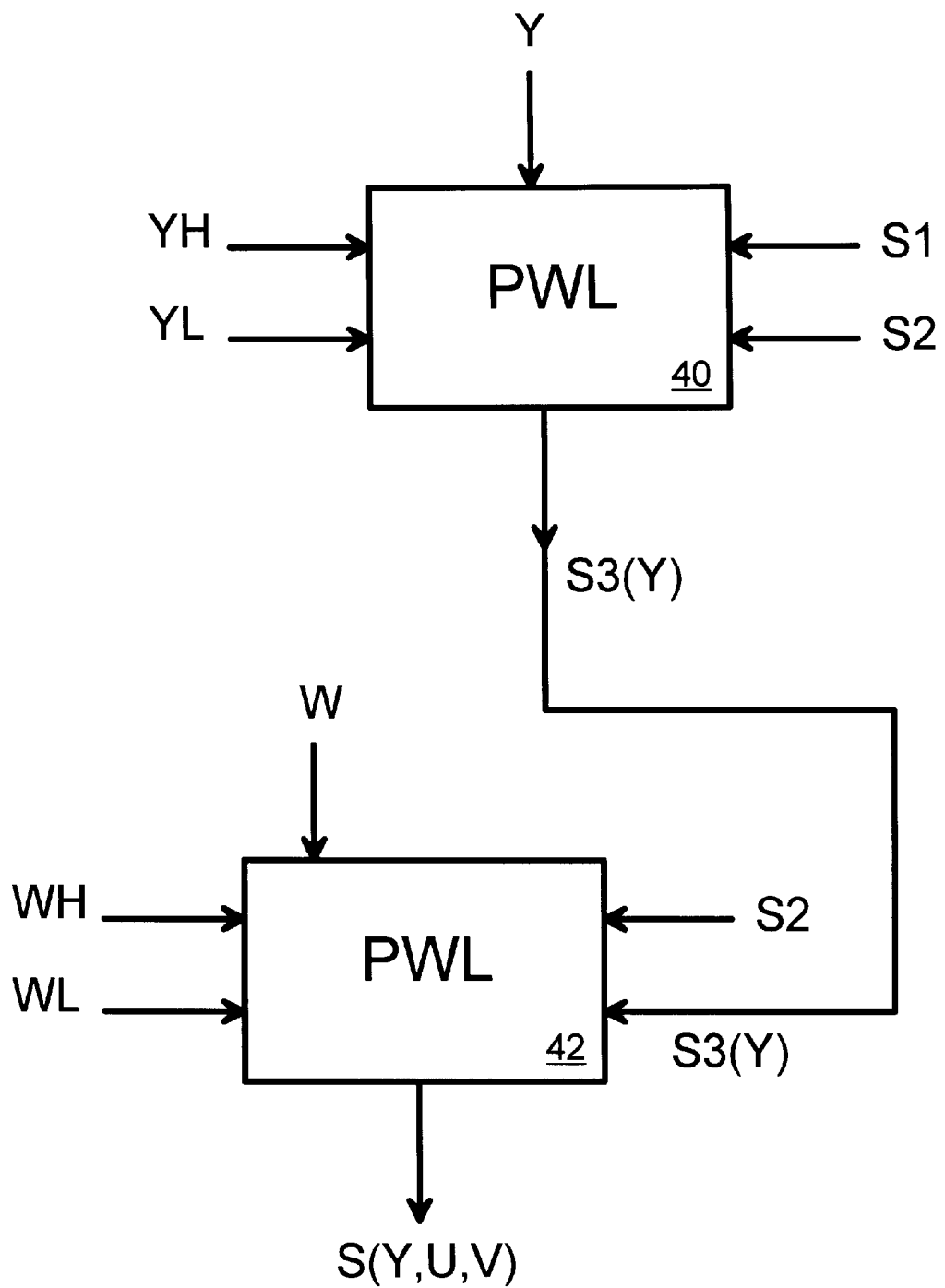
FIG. 7 shows a scale-factor generator for color-enhancement that adjusts the scale factor in two steps for Y and U/V values of a pixel.

Two-Stage Scale-Factor Generator—FIG. 7

FIG. 7 shows a scale-factor generator for color-enhancement that adjusts the scale factor in two steps for Y and U/V values of a pixel. First-stage calculator 40 receives the luminance Y value of a pixel. This Y value varies for each pixel in a digital image. First-stage calculator 40 receives 4 pre-set inputs: YH, YL, S1, and S2. S1 and S2 are pre-determined scale factors for color-enhancement that can be programmed into a pair of programmable registers. S2 is the maximum scale factor while S1 is the minimum scale factor. YL and YH are the low and high Y range parameters shown in FIG. 4.

First-stage calculator 40 generates a new scale factor S3(Y) which is a function of Y, as well as the pre-set parameters YL, YH, S1, S2. In one embodiment, the intermediate scale factor S3(Y) is generated by a piece-wise-linear (PWL) function. For bright pixels (Y>YH) and for dim pixels (Y<YL), the intermediate scale factor S3(Y) is set to S2. For intermediate-brightness pixels (YL<Y<YH), the intermediate scale factor S3(Y) is reduced in a linear fashion, with a minimum scale factor S1 when Y is exactly halfway between YL and YH.

First-stage calculator 40 thus reduces the intermediate scale factor for intermediate-brightness pixels, resulting in less color-enhancement. For bright or dim pixels, more color enhancement is provided by using the maximum scale factor S2.

Second-stage calculator 42 receives the colorfulness value W, which is generated from the U and V values as shown in FIG. 5. The W input is compared to high and low range parameters WH, WL to determine which of 3 regions the W value is in. A piece-wise-linear (PWL) function is performed by second-stage calculator 42 to generate the final scale factor S(Y,U,V).

Second-stage calculator 42 receives maximum scale-factor parameter S2 and the intermediate scale factor S3(Y) from first-stage calculator 40. When W is in the lower region (W<WL), second-stage calculator 42 outputs the intermediate scale factor S3(Y). When W is in the middle region (WL<W<WH), second-stage calculator 42 outputs a linear function of S3(Y) and S2 as the final scale factor. When W is in the upper region (W>WH), second-stage calculator 42 outputs the maximum scale factor S2.

The scale factor is thus first adjusted for brightness (Y) by first-stage calculator 40, then adjusted for color (W) by second-stage calculator 42. The fixed parameters S1, S2, YL, YH, WL, WH can be re-programmed by loading new values into programmable registers. However, these parameters are typically constants within a single image. The intermediate scale factor S3(Y) varies for each pixel with Y, while the final scale factor S(Y,U,V) varies for each pixel with all three values—Y, U, and V.

Figure 8:
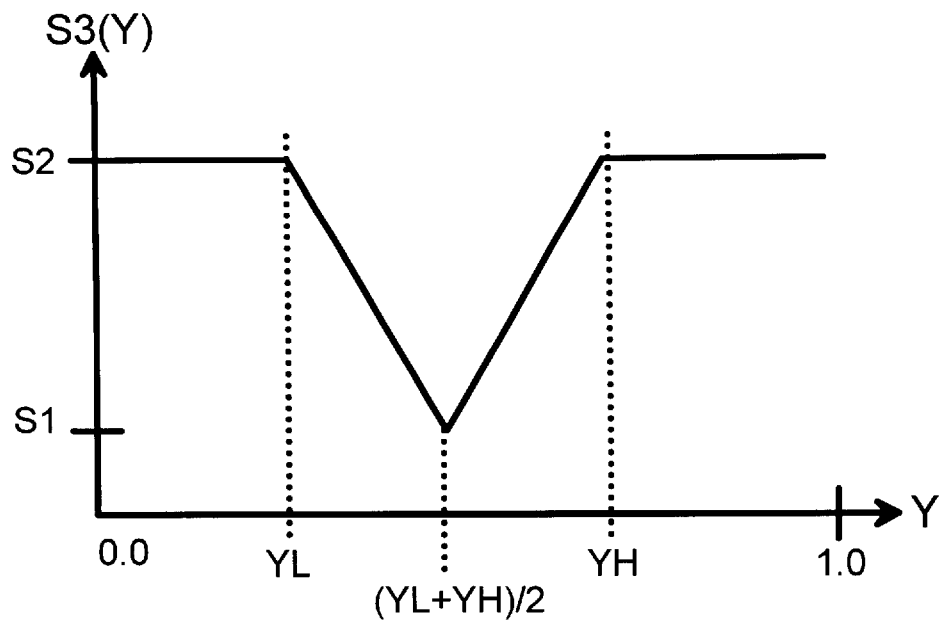
FIG. 8 is a graph showing a piece-wise-linear (PWL) function of Y for generating the intermediate scale factor in the first-stage calculator.
Figure 9:
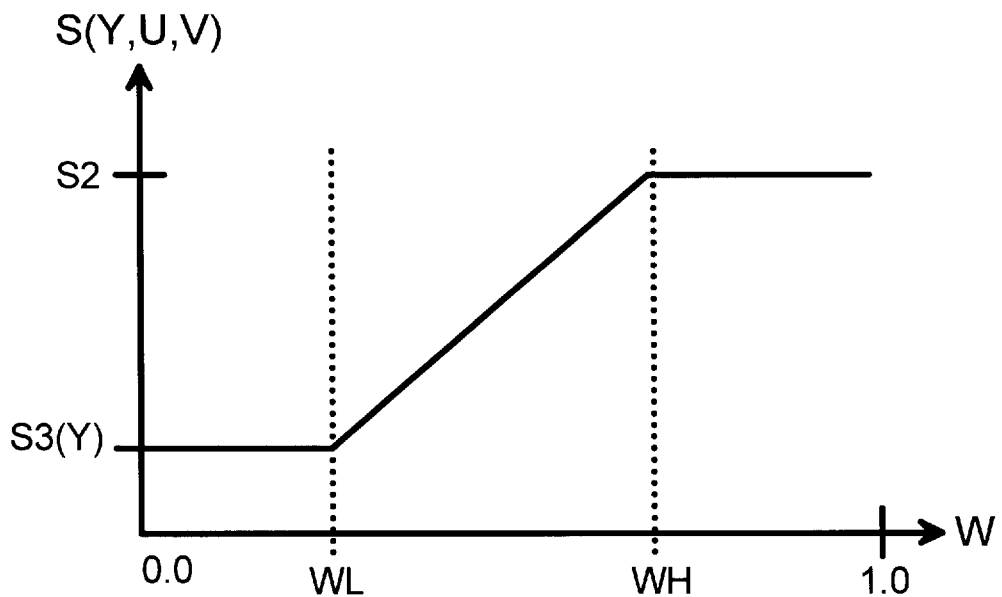
FIG. 9 is a graph showing a piece-wise-linear (PWL) function of U,V for generating the final scale factor in the second-stage calculator.

Graphs of Functions—FIGS. 8, 9

FIG. 8 is a graph showing a piece-wise-linear (PWL) function of Y for generating the intermediate scale factor in the first-stage calculator. This PWL function is performed by first-stage calculator 40 of FIG. 7. Different pixels within an image each have a Y value in the range from 0.0 to 1.0 that is represents by the x-axis of FIG. 8. The Y value of a pixel determines the intermediate scale factor S3(Y) shown on the y-axis. Intermediate scale factor S3 is thus a function of the pixel's luminance Y.

The minimum scale factor S1 and the maximum scale factor S2 are shown on the y-axis. The upper and lower Y range values, YH, YL, are shown on the x-axis. The piece-wise-linear (PWL) function shown in the graph has inflexion points determined by these four parameters.

For bright pixels (Y>YH) and for dim pixels (Y<YL), the intermediate scale factor S3(Y) is set to the maximum, S2.

However, in the middle range of Y, the intermediate scale factor is reduced in a linear fashion. For these intermediate-brightness pixels (YL<Y<YH), the intermediate scale factor S3(Y) is reduced in a linear fashion from S2 at YL to the minimum scale factor S1 when Y is exactly halfway between YL and YH, at Y=(YL+YH)/2. Then the intermediate scale factor is linearly increased from this minimum S1 to the maximum S2 at Y=YH.

This function can be represented as:

$$S3(Y)=S2 \text{ for } Y<YL \text{ or } Y>YH$$

$$S3(Y)=S1+(S2-S1)*2/(YH-YL)*|Y-(YL+YH)/2| \text{ for } YL<Y<YH.$$

Typical values for the parameters are

S1=0.5

S2=1.4

YL=0.3

YH=0.6

YL is usually between 0 and 0.5 while YH is usually between 0.5 and 1.0. The minimum scale factor S1 is usually less than 1.0, while the maximum scale factor is usually greater than 1.0. This provides for color-enhancement at S2 and color reduction at S1. Thus the brightest and the dimmest pixels are color-enhanced, while the intermediate-brightness pixels are color reduced. This has the effect of bringing out the brightest and the darkest parts of a picture which are often the more important parts of a picture.

FIG. 9 is a graph showing a piece-wise-linear (PWL) function of U,V for generating the final scale factor in the second-stage calculator. This PWL function is performed by second-stage calculator 42 of FIG. 7.

The separate U and V chrominance values are combined onto the colorfulness factor W, by summing their absolute values as shown in FIG. 5. Different pixels within an image each have different U and V values, each in the range from −0.5 to +0.5. Dull colors have U and V values near zero, while colorful pixels have U and/or V near +/−0.5. These more colorful pixels have higher W values than do the duller pixels. The colorfulness factor W is represented by the x-axis of FIG. 9.

The W value of a pixel determines the final scale factor S(Y,U,V) using the PWL function graphed in FIG. 9. For more colorful pixels (W greater than WH), a higher value of the final scale factor S is produced than for dull pixels (W less than WL).

The intermediate scale factor S3(Y) and the maximum scale factor S2 are shown on the y-axis. The upper and lower W range values, WH, WL, are shown on the x-axis. The piece-wise-linear (PWL) function shown in the graph has inflexion points determined by these four parameters. Note that while S2, WH, WL are fixed parameters, intermediate scale factor S3(Y) is a variable determined by the function of Y shown in the graph of FIG. 8. For different pixels on an image, the S3(Y) line moves up and down on the graph to represent different S3(Y) values for different Y values, while S2 remains fixed.

When W is in the upper region (W>WH), the second-stage calculator 42 (of FIG. 7) outputs the maximum scale factor S2. This produces the most color enhancement, for the already-colorful pixels in an image. When W is in the lower region (W<WL), the function outputs the intermediate scale factor S3(Y) as shown by the left-most region of the graph. When W is in the middle region (WL<W<WH), the function outputs a linear function of S3(Y) and S2 as the final scale factor.

This function can be represented as:

$$S(Y, W) = S(Y, U, V) = S2 \quad \text{for } W > WH$$

$$S(Y, W) = S(Y, U, V) = S3(Y) \quad \text{for } W < WL$$

$$S(Y,W)=S3(Y)+(S2-S3(Y))*(W-WL)/(WH-WL) \text{ for } WL<W<WH.$$

Typical values for the W range parameters are

WL=0.3

WH=0.6

This function of W provides for color-enhancement at S2 and possible color reduction at S3(Y). Thus the most colorful pixels are color-enhanced, while the least-colorful pixels are color reduced. This has the effect of bringing out the most colorful parts of a picture which are often the more important parts of a picture. The least-colorful parts of a picture are often the background part of a picture, and these parts may be color-reduced or color-enhanced the least.

For example, a landscape pictures of a meadow of flowers in the foreground with mountains in the background often shows the flowers in distinct colors, while the background mountains are grayish in color. Using the color enhancement method described, the foreground flowers are made more colorful, while the gray background mountains are grayed even more.

Figure 10:
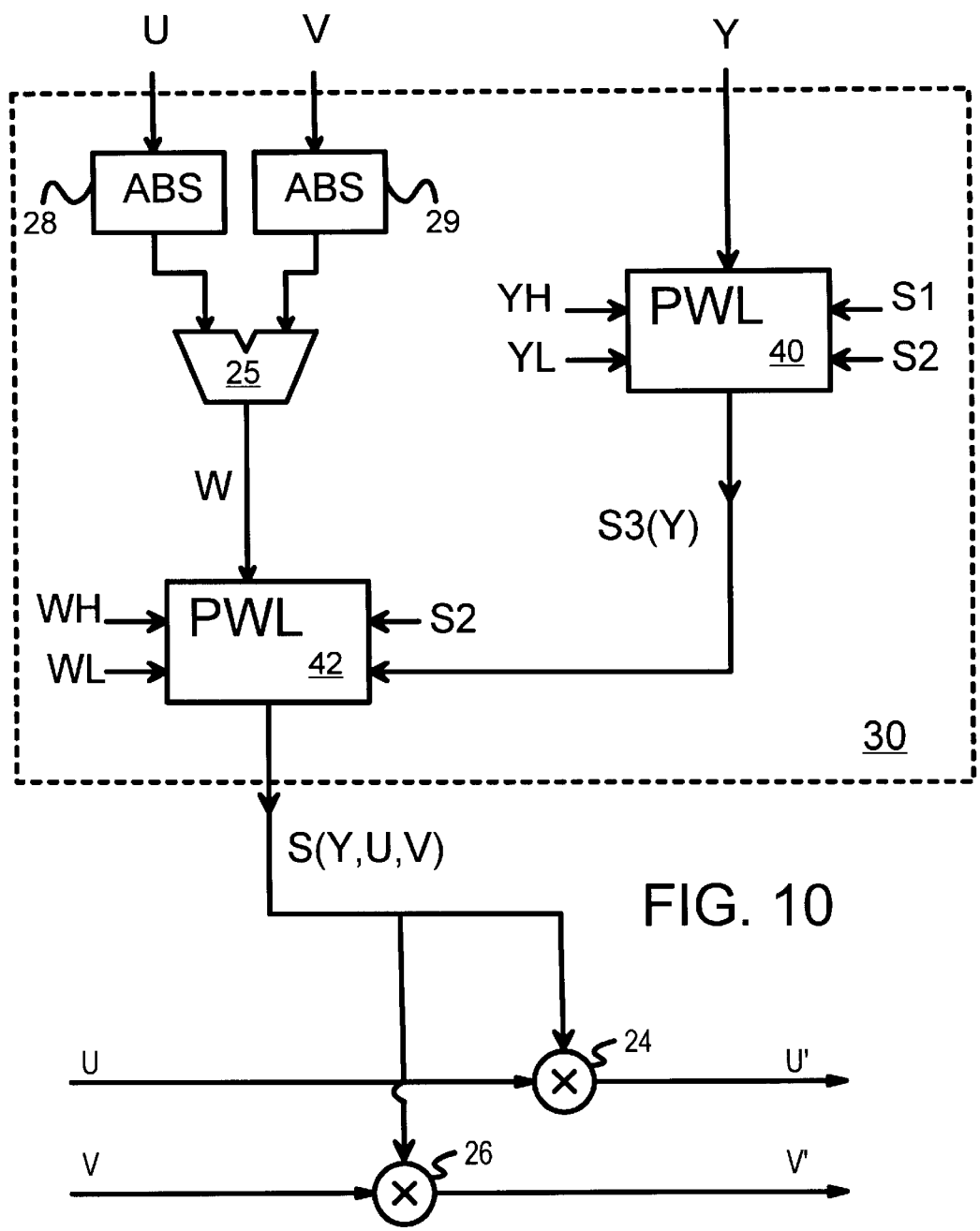
FIG. 10 shows an overall diagram of a color enhancer that adaptively operates on a pixel-by-pixel basis.

Pixel-Level Color Enhancer—FIG. 10

FIG. 10 shows an overall diagram of a color enhancer that adaptively operates on a pixel-by-pixel basis. The Y, U, and V value of a current pixel are sampled and input to color enhancer calculation unit 30.

The U and V color values are first combined into the single colorfulness factor W. Absolute-generator 28 generates the absolute value of the U component, while absolute-generator 29 calculates the absolute value of the V component. Adder 25 receives the absolute values of U and V from absolute-generators 28, 29 and outputs their sum as colorfulness factor W. Thus W=|U|+|V|. The component W is a numerical representation of the overall colorfulness of a YUV pixel. Pixels with higher W values often appear to be more colorful than do pixels with smaller W values.

First-stage calculator 40 receives the luminance Y value of the current pixel. First-stage calculator 40 receives the pre-set inputs: YH, YL, S1, and S2. S1 and S2 are pre-determined scale factors for color-enhancement programmed into a pair of programmable registers. S2 is the maximum scale factor while S1 is the minimum scale factor. YL and YH are the low and high Y range parameters.

First-stage calculator 40 generates a new scale factor S3(Y) which is a function of Y, as well as the pre-set parameters YL, YH, S1, S2. In one embodiment, the intermediate scale factor S3(Y) is generated by a piece-wise-linear (PWL) function such as shown in FIG. 8. First-stage calculator 40 reduces the intermediate scale factor for intermediate-brightness pixels, resulting in less color-enhancement for these average-intensity pixels. For bright or dim pixels, more color enhancement is provided by using the maximum scale factor S2.

First-stage calculator 40 can operate in parallel with adder 25 to reduce delays. A single calculator can also be used twice, such as programmable routines executing on a digital-signal processor (DSP).

Second-stage calculator 42 receives the colorfulness value W, from adder 25, that combines the U and V values of the current pixel. Second-stage calculator 42 also receives the intermediate scale factor S3(Y) from first-stage calculator 40. Second-stage calculator 42 compares the W input to high and low range parameters WH, WL to determine which of 3 regions the W value is in. A piece-wise-linear (PWL) function (shown in FIG. 9) is performed by second-stage calculator 42 to generate the final scale factor S(Y,U,V).

When W is in the lower region (W<WL), second-stage calculator 42 outputs the intermediate scale factor S3(Y). When W is in the middle region (WL<W<WH), second-stage calculator 42 outputs a linear function of S3(Y) and S2 as the final scale factor. When W is in the upper region (W>WH), second-stage calculator 42 outputs the maximum scale factor S2.

The scale factor is thus first adjusted for brightness (Y) by first-stage calculator 40, then adjusted for color (W) by second-stage calculator 42. The fixed parameters S1, S2, YL, YH, WL, WH can be re-programmed by loading new values into programmable registers. However, these parameters are typically constants within a single image. The intermediate scale factor S3(Y) varies for each pixel with Y, while the final scale factor S(Y,U,V) varies for each pixel with all three values—Y, U, and V.

The scale factor S(Y,U,V) generated by calculation unit 30 is applied to multipliers 24, 26. Multiplier 24 receives the U component and multiplies it by scale factor S to produce the color-enhanced component U'. Multiplier 26 receives the V component and multiplies it by scale factor S to produce the color-enhanced component V'. This scale factor is a function of all three components of the current pixel.

Figure 11:
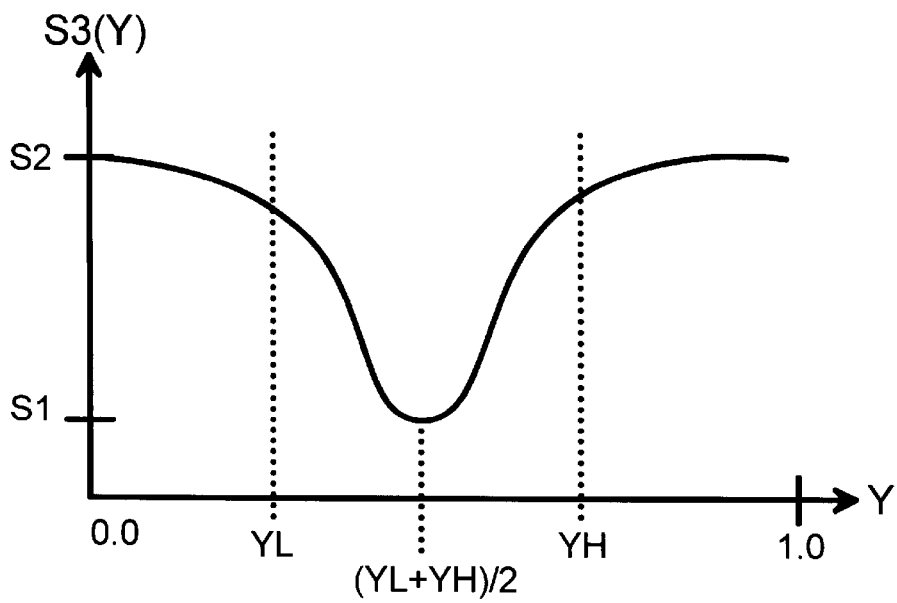
FIG. 11 is a graph of a smoothed function that generates the intermediate scale factor S3 from luminance Y.
Figure 12:
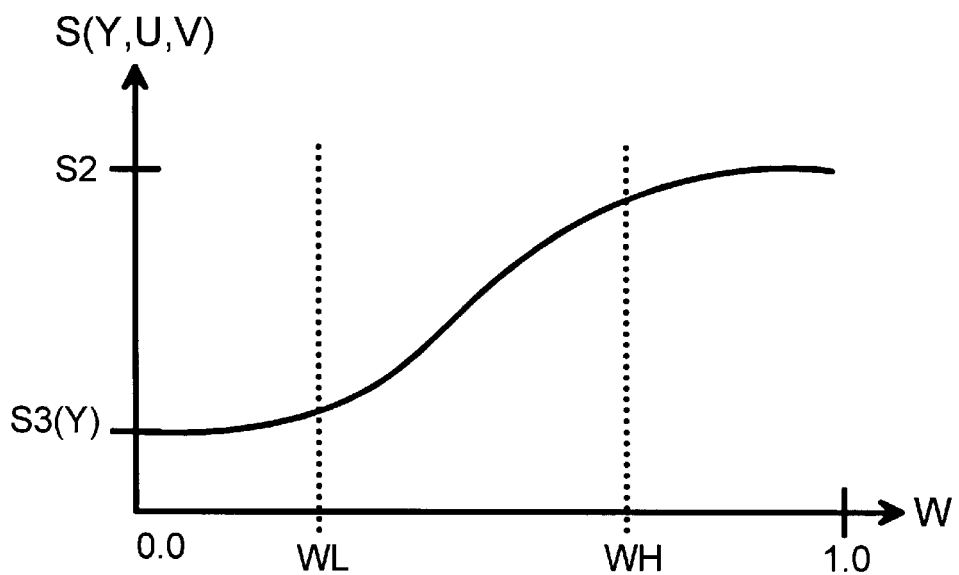
FIG. 12 is a graph of a smoothed function that generates the final scale factor from the colorfulness factor W.

Other Functions—FIGS. 11, 12

While piece-wise-linear (PWL) functions are perhaps the easiest to implement, other functions may be substituted. FIG. 11 is a graph of a smoothed function that generates the intermediate scale factor S3 from luminance Y. The PWL function of FIG. 8 may be smoothed to more gradually change color enhancement. A polynomial function can replace the PWL function. A digital-signal processor (DSP) can be programmed for these more complex functions, although more calculation time may be needed for the more complex functions. These more complex functions may produce more pleasing color enhancement.

FIG. 12 is a graph of a smoothed function that generates the final scale factor from the colorfulness factor W. The slope of the PWL function of FIG. 9 changes abruptly at WL and WH. This abrupt slope change in the PWL function may produce visual artifacts. These points at WL, WH can be smoothed using a more complex function. Again, a polynomial function can be applied by a programmed calculation unit to produce S(Y,U,V) from the W value and the intermediate scale factor S3(Y).

A PWL function could be used for the intermediate scale factor while a more complex smoothed function can be used for the final scale factor. Alternatively, a PWL function can be used for most values of Y and W, while a smoothed function used near the inflexion points WH, WL. An additional stage could also be used to smooth the final scale factor from second-stage calculator 42. This smoothing stage could be triggered by W values near WH and WL.

ADVANTAGES OF THE INVENTION

The color-enhancement scale factor is adaptively changed on a pixel-by-pixel basis. Different scale factors are used within a particular image. The scale factor is varied depending on the color and brightness of the pixel being enhanced. The scale factor varies as a function of the Y, U, and V values of the pixel being color-enhanced. An adaptive color-enhancement function and method is employed.

Both color-enhancement and color reduction can be applied to different portions of a digital image. The most colorful pixels are color-enhanced, while the least-colorful pixels are color reduced. This has the effect of bringing out the most colorful parts of a picture which are often the more important parts of a picture. The least-colorful parts of a picture are often the background part of a picture, and these parts may be color-reduced or color-enhanced the least.

For example, a landscape pictures of a meadow of flowers in the foreground with mountains in the background often shows the flowers in distinct colors, while the background mountains are grayish in color. Using the color enhancement method described, the foreground flowers are made more colorful, while the gray background mountains are grayed even more. Thus the more important parts of a picture are enhanced, while other parts of the picture are not. Objects that are gray or white are not color enhanced to preserve their lack of color.

ALTERNATE EMBODIMENTS

Several other embodiments are contemplated by the inventors. For example different pixel-data encodings and primary colors can be used. Bit widths can be varied. Many data formats may be used with the invention. Additional functions can be added. Many arrangements of adders, shifters, and logic units are possible. Adders in a calculation unit may be reused or used recursively. Some image sensors may alter the image pattern in different ways, and the colors may be affected. Various modifications can be made as needed. The calculation and the scaling can be pipelined.

A hue adjustment circuit can follow the color-enhancement device. The hue adjustment can rotate the U,V vector. Gamma correction can also be used to adjust the luminance Y. The colorfulness factor W can be calculated in other ways, such as by taking a maximum of the absolute values of U and V.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A color enhancer comprising:

a pixel input receiving a YUV pixel that includes a Y component indicating brightness but not color of the pixel, and U and V components indicating a color but not brightness of the pixel;

a calculator, receiving pre-set scale factors, the pre-set scale factors being constant for a range of pixels in an image, for generating an enhancement factor from the Y component and from the U and V components and the pre-set scale factors;

wherein the enhancement factor varies with the Y, U, and V components of the YUV pixel, the enhancement factor being a different value for different pixels in the image;

a first multiplier, receiving the U component from the pixel input, for multiplying the enhancement factor from the calculator by the U component to generate an adjusted U component;

a second multiplier, receiving the V component from the pixel input, for multiplying the enhancement factor from the calculator by the V component to generate an adjusted V component; and an output, coupled to the pixel input, the first multiplier, and the second multiplier, for outputting the Y component from the pixel input with the adjusted U and V components from the first and second multiplier as a color-enhanced pixel;

wherein the calculator further comprises:

a combiner, receiving the U and V components from the pixel input, for combining the U and V components to generate a colorfulness factor, the colorfulness factor representing a degree of color for the pixel;

a function generator, receiving the Y component and the colorfulness factor and the pre-set scale factors, for generating the enhancement factor wherein the enhancement factor is larger for more colorful pixels having large colorfulness factors than for less colorful pixels having small colorfulness factors, wherein more color enhancement occurs for more colorful pixels;

wherein the function generator comprises:

a first stage, receiving the Y component from the pixel input, for generating an intermediate factor that is a function of the Y component;

a second stage, receiving the intermediate factor from the first stage and receiving the colorfulness factor from the combiner, for generating the enhancement factor that is a function of the colorfulness factor;

wherein the first stage outputs a maximum pre-set factor as the intermediate factor when the Y component is above an upper Y limit or below a lower Y limit, wherein the first stage outputs a combination of the maximum pre-set factor and a minimum pre-set factor when the Y component is between the upper Y limit and the lower Y limit, whereby pixels are color enhanced with the enhancement factor that is generated for each pixel that varies with the Y, U, and V components of the YUV pixel, and whereby both brightness and color of the YUV pixel can determine the enhancement factor for the YUV pixel, and whereby color enhancement is reduced when the Y component is between the upper Y limit and the lower Y limit.

2. The color enhancer of claim 1 wherein the function generator also generates the enhancement factor wherein the enhancement factor is larger for brighter pixels having a large Y component than for average pixels having a moderate Y component, wherein bright pixels are color enhanced more than other pixels.

3. The color enhancer of claim 1 wherein the second stage outputs the maximum pre-set factor as the enhancement factor when the colorfulness factor is above an upper color limit;

wherein the second stage outputs the intermediate factor from the first stage when the colorfulness factor is below a lower color limit;

wherein the second stage outputs a combination of the intermediate factor from the first stage and the maximum pre-set factor when the colorfulness factor is between the upper color limit and a lower color limit, whereby color enhancement is maximum for colorful pixels but reduced for dull pixels.

4. The color enhancer of claim 3 wherein the combination of the intermediate factor from the first stage and the maximum pre-set factor is a linear combination that depends on the colorfulness factor of the YUV pixel.

5. The color enhancer of claim 1 wherein the combiner comprises:

a first absolute generator, receiving the U component, for generating an absolute value of the U component;

a second absolute generator, receiving the V component, for generating an absolute value of the V component;

an adder, receiving the absolute values of the U and V components, for outputting the colorfulness factor, whereby the colorfulness factor combines absolute values of U and V components.

6. A method for enhancing pixels in a digital image comprising:

for each pixel in a digital image:

receiving a current pixel value that includes a color value and a brightness value;

comparing the brightness value to a first brightness limit, and outputting a maximum factor as an intermediate factor when the brightness value exceeds the first brightness limit;

comparing the brightness value to a second brightness limit, and outputting the maximum factor as the intermediate factor when the brightness value is less than the second brightness limit;

using a first function to generate the intermediate factor when the brightness value is between the first and second brightness limits;

comparing the color value to a first color limit, and outputting the maximum factor as an enhancement factor when the color value exceeds the first color limit;

comparing the color value to a second color limit, and outputting the intermediate factor as the enhancement factor when the color value is less than the second color limit;

using a second function to generate the enhancement factor when the color value is between the first and second color limits;

adjusting the color value with the enhancement factor to generate an adjusted color value; and replacing the color value with the adjusted color value for the current pixel value, whereby color is adjusted in response to the brightness value and color value of each pixel in the digital image.

7. The method of claim 6 further comprising:

generating a colorfulness factor from the color value for each pixel by:

generating a first absolute value of a first color component for the pixel;

generating a second absolute value of a second color component for the pixel;

adding the first and second absolute values to generate the colorfulness factor;

using the colorfulness factor as the color value when comparing to the first and second color limits, whereby the colorfulness factor is used for comparison.

8. The method of claim 7 further comprising:

using a linear approximation of a minimum factor and the maximum factor as the first function to generate the intermediate factor wherein the intermediate factor is the minimum factor at a point between the first and second brightness limits but the intermediate factor is the maximum factor at the first and second brightness limits;

using a linear approximation of the intermediate factor and the maximum factor as the second function to generate the enhancement factor, whereby linear functions are employed.

9. The method of claim 8 further comprising:

before a new digital image is processed, storing pre-set values to programmable registers, the pre-set values including the maximum factor, the minimum factor, the first and second brightness limits, and the first and second color limits, whereby pre-set values are constant for pixels the digital image but different enhancement factors are generated for each pixel within the digital image.

* * * * *